United States Patent [19]
Richardson

[11] 3,764,093
[45] Oct. 9, 1973

[54] AIRCRAFT HAVING VARIABLE SWEEP-BACK WINGS

[75] Inventor: James Paul Richardson, Lytham, England

[73] Assignee: British Aircraft Corporation Limited, London, England

[22] Filed: Mar. 3, 1970

[21] Appl. No.: 24,413

[30] Foreign Application Priority Data
Mar. 7, 1969 Great Britain.................. 12,301/69

[52] U.S. Cl. ................................................. 244/46
[51] Int. Cl. ............................................. B64c 3/40
[58] Field of Search ...................... 244/46; 308/1, 3; 180/79

[56] References Cited
UNITED STATES PATENTS
| | | | |
|---|---|---|---|
| 2,683,574 | 7/1954 | Peterson | 244/46 |
| 2,794,608 | 6/1957 | Johnson | 244/46 |
| 3,018,985 | 1/1962 | Voigt | 244/46 |
| 3,023,983 | 3/1962 | Boorer | 244/46 |
| 3,023,984 | 3/1962 | Brennan | 244/46 |

Primary Examiner—Robert F. Stahl
Attorney—Cushman, Darby & Cushman

[57] ABSTRACT

A wing pivot assembly for an aircraft having variable-sweep-back wings which comprises a pair of vertically-spaced lugs secured to a wing and a cooperating pair of vertically-spaced lugs secured to the fuselage structure of the aircraft, the fuselage lugs lying inside and close to the wing lugs. The opposed adjacent faces of the upper wing lug and fuselage lug are formed with coaxial annular tongue and groove formations which are rotatably interengaged with one another to form a bearing arrangement, and the opposed adjacent faces of the lower wing lug and lower fuselage lug are formed with similar rotatably engaged tongue and groove formations coaxial with the first. The lugs are formed with aligned central apertures surrounded by and coaxial with the tongue and groove formations and are clamped by means of two clamping bolts and nuts whereof the one clamping bolt is passed through the central apertures of the upper wing lug and upper fuselage lug and clamps the two together, whilst the other clamping bolt extends through the central apertures of the lower wing nut and the lower fuselage nut and clamps the two together. The tongue and groove formations are of V-section having flat crests and flat bottoms respectively, and means is provided for introducing lubricant between the cooperating tongue and groove formations via conduits in the associated clamping bolts.

6 Claims, 2 Drawing Figures

Patented Oct. 9, 1973

INVENTOR
JAMES P. RICHARDSON
BY CUSHMAN, DARBY
+ CUSHMAN
ATTORNEYS

AIRCRAFT HAVING VARIABLE SWEEP-BACK WINGS

The present invention relates to aircraft having variable sweep-back wings, in which the wings pivot about substantially vertical axes in relation to the fuselage to alter their angle of sweep-back.

The term "vertical" is used herein to mean the direction, in relation to the aircraft, which is vertical in normal unbanked level flight.

An object of the invention is to provide an improved form of wing pivot assembly.

According to the invention, an aircraft wing pivot assembly comprises a pair of vertically-spaced lugs forming part of a fuselage structure, a further pair of vertically-spaced lugs forming part of a wing structure, one pair of lugs lying between the other pair, the upper lugs of the two pairs being rotatably engaged with one another through a series of concentric mating annular tongues and grooves, and the lower lugs of the two pairs being rotatably engaged with one another through a second series of mating annular tongues and grooves concentric with the first series.

Preferably the lugs are provided with co-axial apertures and the tongues and grooves are formed on the lugs around and concentrically with the apertures. The tongues and grooves of the upper lugs and the tongues and grooves of the lower lugs can then be respectively held in mating engagement by a clamping means.

Conveniently the tongues and grooves are of 'V' shaped cross-section with flat portions at the crests and troughs.

The invention may be carried into practice in various ways, but one specific embodiment of the invention will now be described by way of example and with reference to the accompanying drawings, in which.

Figure 1:
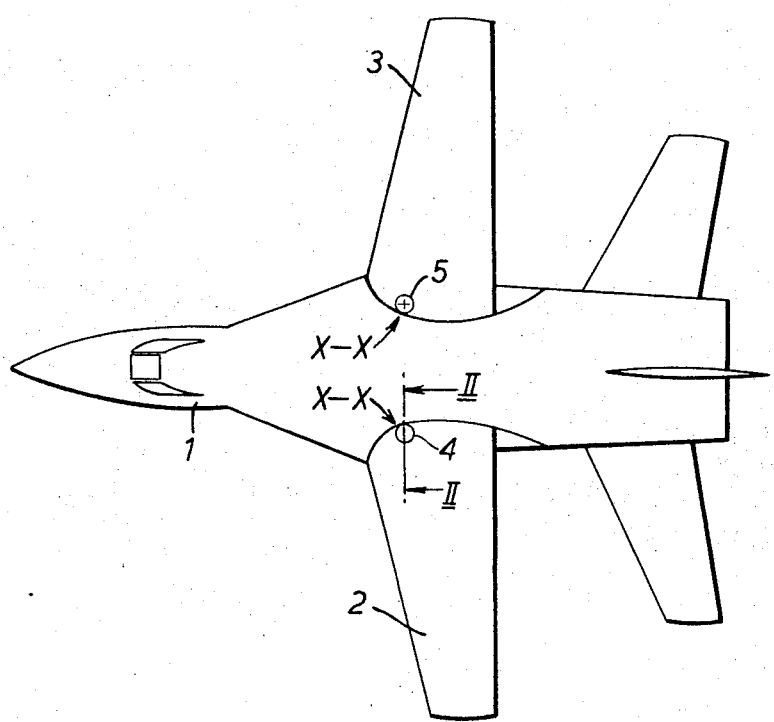
FIG. 1 is a plan view of an aircraft.

Referring initially to FIG. 1 an aircraft has a fuselage 1 and variable sweep-back wings 2 and 3 which respectively pivot about substantially vertical axes X—X on wing pivot assemblies 4 and 5. The wing pivot assemblies 4 and 5 are identical in all major aspects and for clarity only one, namely the assembly 4, will be fully described.

Figure 2:
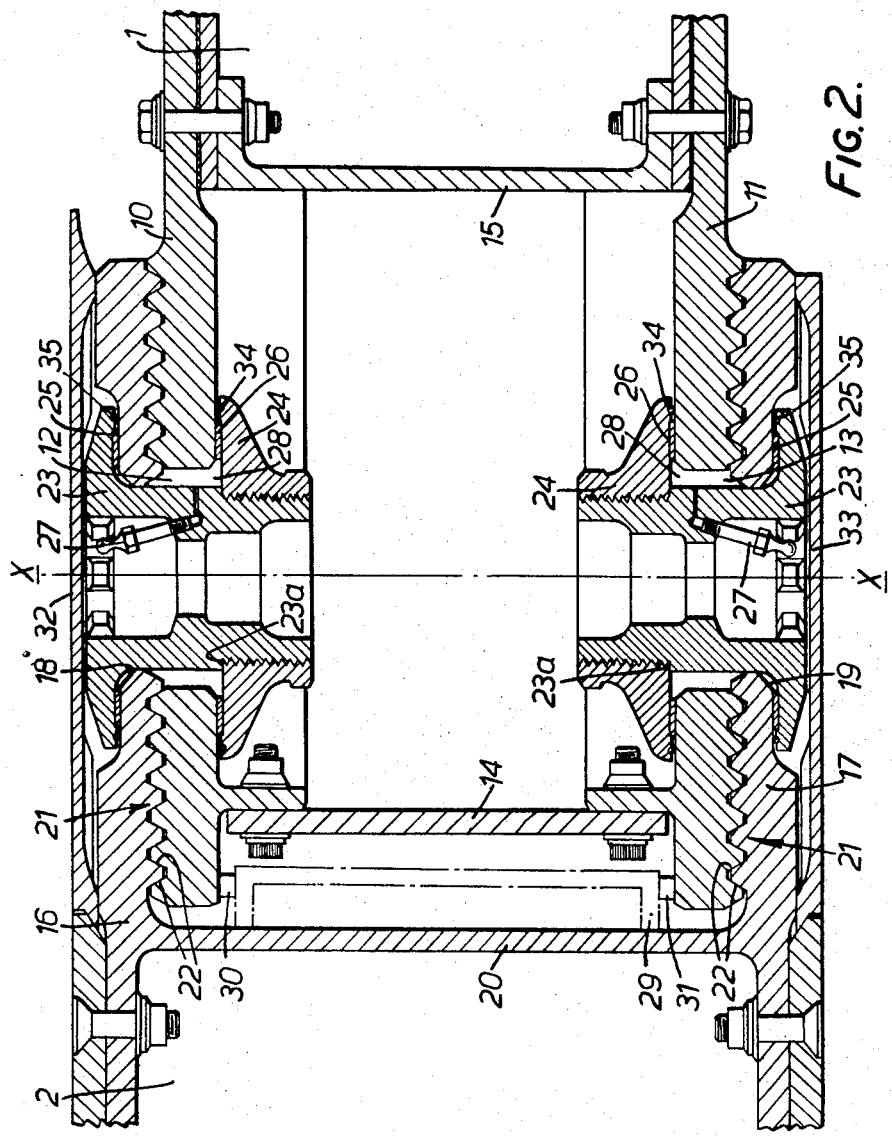
FIG. 2 is a section through the substantially vertical major axis of a wing pivot assembly, that is to say, on line II—II of FIG. 1.

Referring now to FIG. 2, the fuselage 1 is provided with a pair of laterally-extending vertically-spaced lugs 10, 11 which have apertures 12, 13 respectively formed co-axially therein. The lugs are spaced by webs 14 and 15, the web 14 being removable to allow access to the interior of the pivot during assembly.

The root of the wing 2 is also provided with a pair of vertically-spaced lugs 16, 17 which have apertures 18, 19 respectively formed co-axially therein. These lugs are respectively positioned above and below the lugs 10, 11, that is to say outside the fuselage lugs, and are spaced by a web 20.

The apertures 12, 13 and 18, 19 are positioned co-axially with one another and with the substantially vertical axis X—X, this axis being the major axis of the wing pivot assembly.

The upper lugs 10 and 16 of the two pairs are closely adjacent to one another and are provided with a series of co-operating concentric mating annular tongues and grooves 21. The tongues and grooves 21 are of 'V' shaped cross-section with flat portions at their crests and troughs, and their flanks 22 form a series of frusto-conical bearing surfaces, the common axis of which is coincident with the axis X—X.

The lower lugs 11 and 17 of the two pairs are also closely adjacent one another and are provided with similar series of concentric mating tongues and grooves 21 with flanks 22.

The upper lugs 10 and 16 are clamped together to hold their tongues and grooves 21 in load-bearing engagement by a clamping arrangement comprising a headed tubular bolt 23 having a nut 24 screwed onto it. The lower lugs 11 and 17 are clamped together by a second bolt 23 and nut 24, in a similar manner. Both bolts 23 extend inwards with their heads engaging the respective outer lugs 16 and 17 through pads 25 of low-friction bearing material. The nuts 24 are threaded onto the inner ends of the bolts 23 and, on tightening, engage the inner lugs 10 and 11 through pads 26 also of low friction bearing material.

Each bolt 23 has a shoulder 23a with which its nut 24 engages when correctly tightened. This prevents excessive clamping loads being applied to the lugs 10, 16 and 11, 17 respectively. The clamping loads can be adjusted by using the pads 25, 26 as shims. Each bolt 23 is further provided with a grease nipple 27 by means of which a lubricant such as a molybdenum-disulphide-impregnated grease may be admitted into cavitites 28 formed by the apertures 12, 13 and their respective pins 23 and hence by way of interconnecting grooves (not whown) to all the tongues and grooves 21.

Sealing rings 34, 35 are provided between the nuts 24 and the lugs 10, 11 and between the bolts 23 and the lugs 16, 17 respectively, to prevent the lubricant exuding from the cavities 28.

It is envisaged that a wing pivot assembly according to the present invention will transmit wing shear loads to the fuselage in addition to bending loads, but if the sizes of the components of the assembly are reduced to take bending loads only, the shear loads will require to be transmitted by an additional structure. Conveniently, this comprises a bracket 29 extending from the wing structural web member 20 and carrying opposed bearing pads 30, 31 which engage with the inside faces of the lugs 10, 11, respectively.

Cover plates 32, 33 are provided above and below the wing pivot assembly to provide a smooth exterior contour continuous with that of the wing.

What we claim as our invention and desire to secure by Letters Patent is:

1. An aircraft wing pivot assembly which comprises a pair of vertically-spaced upper and lower lugs forming part of a fuselage structure, a further pair of vertically-spaced upper and lower lugs forming part of a wing structure, one pair of lugs lying between the other pair, and in which the upper lugs of the two pairs are rotatably engaged with one another through a series of concentric mating annular tongues and grooves, and the lower lugs of the two pairs are rotatably engaged with one another through a second series of mating annular tongues and grooves concentric with the first series.

2. An aircraft wing pivot assembly according to claim 1 in which the lugs are provided with co-axial apertures and the tongues and grooves are formed on the lugs around and concentrically with the apertures, the tongues and grooves of the upper lugs and the tongues and grooves of the lower lugs being respectively held in mating engagement by clamping means.

3. An aircraft wing pivot assembly according to claim 2 in which the clamping means comprise two nut and bolt assemblies, the bolt of one assembly extending through the apertures in the upper lugs and the bolt of the other assembly extending through the apertures in the lower lugs, the nuts and bolts engaging the surfaces of respective lugs facing away from the respective tongues and grooves through pads of low-friction bearing material.

4. An aircraft wing pivot assembly according to claim 3 wherein the bolts of both clamping means are tubular and are provided with shoulders engageable by their respective nuts to prevent excessive tightening.

5. An aircraft wing pivot assembly according to claim 1 in which the tongues and grooves are of 'V' shaped cross-section with flat portions at the crests and troughs.

6. An aircraft wing pivot assembly according to claim 1 in which that pair of lugs lying between the other pair of lugs has surfaces engaged by opposed bearing pads carried on a bracket in structural association with said other pair of lugs.

* * * * *